United States Patent Office.

EDWIN ROBBINS, OF SOMERS TOWN, ENGLAND.

Letters Patent No. 99,479, dated February 1, 1870; patented in England, January 6, 1869.

---

DECORATIVE SLAB FORMED FROM PLASTIC MATERIALS.

---

The Schedule referred to in these Letters Patent and making part of the same.

---

*To all whom it may concern:*

Be it known that I, EDWIN ROBBINS, of Somers Town, in the county of Middlesex, England, have invented a new and useful Improvement in Decorating Slabs and other Articles Formed from Plastic Materials; and I do hereby declare that the following is a full, clear, and exact description of the same.

My invention relates to decorating slabs and other articles formed from plastic materials.

When carrying out my invention, I transfer colors or materials of a decorative character, from a surface to which such color or decorative materials have been applied, to the surface of plastic material, while in a plastic state, and so that the decoration will be embedded in the surface of the plastic material when indurated.

The color or design may be formed, deposited, drawn, or painted upon a table or surface, or upon the surface of a mould or die, the surface of which may be of any form corresponding with the form of the article to be formed or moulded, or the design may be drawn or deposited upon a flexible or elastic surface, which can be applied to the surface of plastic material to be ornamented, while such material is in a plastic state.

When carrying out my invention for the decoration of slabs or other shapes formed of plastic material, a great variety of decorative materials may be employed.

As an illustration of one application of my invention, I will describe a method that may be employed for the production of a decorative slab; but I do not confine myself to this particular application of my invention, which may be applied to a great variety of surfaces or objects; but any intelligent workman, acquainted with moulding and decorating articles in plastic material, aided by the illustration herein given of my invention, will readily apply the same, according to requirement.

I employ a table or surface of glass, marble, or of any suitable material; but I find a table answer the purpose, formed of glass, the surface of which has been ground or more or less roughened by the action of fluoric acid. Upon the surface of the table I apply the color or decorative material, which may be evenly distributed or washed over the whole surface. A design may be drawn upon the surface with ordinary crayons, or with crayons formed from a compound of color or pigment of other material, with cement, plaster, or other material, which will combine or set with the plastic material of which the slab is to be formed, such crayons being formed by pressure or by the employment of some volatile binding-liquid, which will evaporate, and will not affect the setting-property of the cement, plaster, or other material with which the pigment, color, or decorative material is compounded; or the surface or design may be wholly or partly painted or delineated with water or distemper-colors, or decorative materials, or with colors or materials compounded with cement or plaster and a volatile liquid; or the surface or design may be otherwise produced, as will be readily understood by an artist or designer, care being taken that the decorative materials employed are so prepared that they will adhere to or combine with the plastic material to which they are to be transferred.

The design may be printed, photographed, or otherwise formed upon the table or surface, or it may be painted, drawn, printed, photographed, or otherwise formed upon another surface of paper, woven fabric, collodion, or other material, and transferred or applied to the table-surface, and, after the decorative material has been applied to the table or surface-parts of such decorative material, may be removed, and the spaces, if desired, filled in with other decorative materials.

Netting, lace-work, or designs formed in wire or fibrous materials may have decorative color or material applied thereto, and such decorative color or material may be transferred to the table-surface.

Adhesive material may be printed upon or applied to the surface or table, in any figure or design, and pulverized decorative materials applied to such adhesive pattern.

Stencil-plates may be used, and any other known means may be employed, alone or in combination with one another, to form a decorative surface.

After the table-surface or mould has had the decoration applied thereto, as above described, I apply the plastic material, which is to form a slab or object, having the decoration thereon.

When forming a slab, such slab may be formed separately, and afterward applied to the table or surface or the plaster, cement, or other material to form the slab, may be applied in a dry state, and afterward "gauged" or moistened; or it may be run over the table or surface, and in this case a sheet of wire gauze or perforated metal may be placed over the surface or table, and supported thereon at intervals by means of points, so that as the cement or plastic material is run over such gauze or perforated surface, it will sink through the meshes or perforations without disturbing the design or decoration upon the table.

The decorative material or design may be drawn, or painted, or otherwise deposited upon a woven fabric or upon an elastic or flexible material, and then applied to a surface of plaster or cement, and this may be done after plaster or cement has been applied to the wall or surface where it is intended to remain, or the plaster or cement may be first applied to the plastic or flexible decorated surface, and afterward applied, while in a plastic state, to a column or other surface or mould, to form various objects. After the cement or plastic material has set, or hardened, it is separated from the table-surface, or mould, and the surface will then have embedded therein the design or other decoration which was previously upon the surface of the table, mould, or elastic, or flexible, or other fabric or surface, and the slab or other article can then be polished, varnished, or enamelled, if desired.

Objects formed in plaster or cement or other plastic materials, may thus be decorated with marbled effects or with ornamental designs or pictures, in endless variety.

Articles produced according to my invention, as above described, will have the picture or other decoration incorporated with the article, which will present a uniform surface corresponding with the surface upon which the article was moulded, in place of presenting irregularities at those parts where the decoration is applied.

I would have it understood that when forming slabs or articles from plaster, in accordance with my invention, when required, I strengthen such slabs or articles by the insertion of canvas or other suitable materials, as heretofore practised; and after such slabs or other articles have been prepared, and are yet in the plastic state, they may be introduced into a chamber and the air exhausted therefrom, so as to condense and remove air-bubbles from such articles, and in some cases the plaster or cement may be applied to the decorated table-surface or mould, in a chamber from which the air has been exhausted, and pressure may afterward be applied to such articles by means of air, or by mechanical means, so as to condense and solidify them.

What is here claimed, and desired to be secured by Letters Patent, is—

Transferring a decorative design or surface from a table or other surface or mould to plaster, cement, or other plastic material, such decorative design or surface, upon the table or other surface or mould, being brought in contact with the plastic material before such plastic material is set or hardened, and so that when hardened, the decorative design will be transferred from the table or other surface or mould to, and fixed in the surface of the plastic material, substantially as hereinbefore described.

EDWIN ROBBINS.

Witnesses:
  CHAS. J. GOOCH,
    34 *Southampton Buildings,*
      *Chancery Lane, London, W. C.*
  T. L. WARNER,
    *No. 17 Gracechurch Street, London, E. C.*